United States Patent
Yonemitsu et al.

[15] 3,678,107
[45] July 18, 1972

[54] PROCESS FOR THE PRODUCTION OF OXALIC ACID

[72] Inventors: Eiichi Yonemitsu, Kashiwa; Tomiya Isshiki, Tokyo; Tsuyoshi Suzuki, Yokkaichi; Yukio Yashima, Soka, all of Japan

[73] Assignee: Mitsubishi Edogawa Kagaku Kabushiki Kaisha, Tokyo, Japan

[22] Filed: March 12, 1970

[21] Appl. No.: 19,104

[30] Foreign Application Priority Data

Feb. 28, 1970 Japan...................................45/16694
March 15, 1969 Japan..................................44.19240

[52] U.S. Cl. .........................................................260/531 R
[51] Int. Cl..........................................................C07c 51/26
[58] Field of Search ..............................................260/531 R

[56] References Cited

UNITED STATES PATENTS

| | | | |
|---|---|---|---|
| 3,531,520 | 10/1970 | Obmoinov et al................. | 260/531 R |
| 3,444,194 | 5/1969 | Minisci et al...................... | 260/531 R |
| 3,087,963 | 4/1963 | Wiese et al....................... | 260/531 R x |
| 2,867,657 | 1/1959 | Sehvitz,........................... | 260/531 R x |

FOREIGN PATENTS OR APPLICATIONS

| | | | |
|---|---|---|---|
| 165,444 | 3/1965 | U.S.S.R. .............................. | 260/531 |
| 1,487,446 | 5/1967 | France................................. | 260/531 |

OTHER PUBLICATIONS

Noller, Chem. of Organic Cmpds. 3rd ed. Saunders, (1965) pg. 870

*Primary Examiner*—Lorraine A. Weinberger
*Assistant Examiner*—Richard D. Kelly
*Attorney*—Sughrue, Rothwell, Mion, Zinn & MacPeak

[57] ABSTRACT

A process for the production of oxalic acid wherein ethylene glycol and/or glycolic acid are oxidized in the presence of nitric acid with introduction of oxygen.

Nitrogen oxides gases generated in the process are oxidized to nitric acid with oxygen during the reaction. The process is substantially an oxidation of ethylene glycol and/or glycolic acid by oxygen in an acid medium comprising nitric acid and eliminates the use of the nitric acid regeneration system required in usual nitric acid oxidation.

18 Claims, No Drawings

PROCESS FOR THE PRODUCTION OF OXALIC ACID

DETAILED DESCRIPTION OF THE INVENTION

This invention relates to a process for the production of oxalic acid, particularly to a process for oxidizing ethylene glycol and/or glycolic acid to oxalic acid.

Oxalic acid has heretofore been produced through the calcination of sodium formate or the oxidation of saccharide with nitric acid. However, the formate process is complicated, because the process comprises many production stages. Also the process of oxidizing saccharide has such disadvantages as; the yield of oxalic acid based on the carbon in the raw material is as low as 60–70 percent, and the purity of the product is low.

Recently, other processes such as oxidation of ethylene or propylene with nitric acid, have been proposed. But these processes are dangerous because of the possibilities of causing explosions and therefore there are many technical difficulties involved in the practice of these processes. Also, these processes are unable to give high yields of oxalic acid.

A method for manufacturing oxalic acid from ethylene glycol is described in the specification of British Pat. No. 1,095,100, in which ethylene glycol is oxidized with a mixture containing 30–40 percent of sulfuric acid and 20–25 percent of nitric acid at a temperature of 50°–70° C. in the presence of vanadium pentoxide as a catalyst and under a reduced pressure of 10 to 30 mm water column.

In the method described in the specification, nitrogen oxides gases are generated, during the oxidation of ethylene glycol, through reduction of nitric acid. The nitrogen oxides gases liberated are exhausted from the reactor and fed to an absorber. Recovery of nitric acid is carried out in the absorber where the oxidation of the nitrogen oxides to nitrogen peroxide by oxygen and subsequent absorption of the nitrogen peroxide formed take place. The mother liquor employed for the absorption of nitrogen peroxide results from the filtration of oxalic acid crystals and consists principally of sulfuric acid and water. The acid mother liquor which has absorbed nitrogen peroxide, is then recycled to the reactor to be employed again in the oxidation of ethylene glycol.

As is well known, when nitrogen oxides are oxidized with oxygen containing gas to be absorbed into water for producing nitric acid, the gases and the water are cooled so that the oxidation rate and the efficiency of absorption become sufficiently high. If, however the water contains sulfuric acid as in the specification of British Pat. No. 1,095,100, the efficiency of absorption is markedly decreased, so that an enormous absorber is required.

Often such absorber becomes more expensive than the main reactor itself and provides a serious economical drawback.

An object of the present invention is to provide a novel and industrially advantageous process for the production of oxalic acid.

The process of the present invention is based on our discovery that oxalic acid can be produced by oxidation of ethylene glycol and/or glycolic acid in the presence of nitric acid with molecular oxygen.

It has been found that oxalic acid can be produced at high yield, when ethylene glycol and/or glycolic acid are contacted with molecular oxygen in a reaction medium comprising nitric acid.

The reaction mechanisms concerning the present invention are not yet fully known, but may be regarded as follows:

with ethylene glycol
$CH_2OH\cdot CH_2OH + 4NO_2 \rightarrow COOH\cdot COOH + 2H_2O + 4NO$
$4NO + 2O_2 \rightarrow 4NO_2$
$CH_2OH\cdot CH_2OH + 2O_2 \rightarrow COOH\cdot COOH + 2H_2O$
or
$3CH_2OH\cdot CH_2OH + HNO_3 \rightarrow 3COOH\cdot COOH + 8NO + 10H_2O$
$12NO + 6O_2 \rightarrow 12NO_2$
$12NO_2 + 4H_2O \rightarrow 8HNO_3 + 4NO$
$3CH_2OH\cdot CH_2OH + O_2 \rightarrow 3COOH\cdot COOH + 6H_2O$
with glycolic acid,
$CH_2OH\cdot COOH + 2NO_2 \rightarrow COOH\cdot COOH + H_2O + 2NO$
$2NO + O_2 \rightarrow 2NO_2$
$CH_2OH\cdot COOH + O_2 \rightarrow COOH\cdot COOH + H_2O$
or
$3CH_2OH\cdot COOH + 4HNO_3 \rightarrow 3COOH\cdot COOH + 4NO + 5H_2O$
$6NO + 3O_2 \rightarrow 6NO_2$
$6NO_2 + 2H_2O \rightarrow 4HNO_3 + 2NO$
$3CH_2OH\cdot COOH + 3O_2 \rightarrow 3COOH\cdot COOH + 3H_2O$ Surprisingly, it has been also found that the oxidation rate of either ethylene glycol or glycolic acid in the present invention is remarkably faster than the rate of oxidation of the material which is calculated from the individual oxidation rate of ethylene glycol or glycolic acid with nitric acid and that of nitrogen oxides with oxygen. Hence, it is suspected that direct oxydation of the raw material with molecular oxygen may be occuring to some extent, but it has not been proven yet.

As is seen from the above equations, the oxidant which is substantially consumed during the formation of oxalic acid is only oxygen.

Accordingly, in the process of the present invention, oxygen is employed in quantities substantially corresponding to or exceeding the stoichiometrical requirement of oxygen in the above equations to produce desired amount of oxalic acid from ethylene glycol and/or glycolic acid.

An advantage of the present invention is that there is no theoretical requirement as to the amount of nitric acid employed versus the amount of ethylene glycol and/or glycolic acid, because ethylene glycol and/or glycolic acid is oxidized substantially by oxygen in an reaction medium comprising nitric acid.

In the conventional processes, gases such as molecular nitrogen or nitrogen monoxide which are not convertible to nitric acid, are formed during the oxidation.

Such gaseous by-products are formed through the reduction of nitric oxide or nitrogen peroxide by ethylene glycol and/or glycolic acid when the amount of the reducing agent, i. e. ethylene glycol and/or glycolic acid theoretically exceed nitric acid.

However, in the process of the present invention, the reaction takes place in an atmosphere of molecular oxygen or oxygen containing gas and the formation of such unfavorable by-products is prevented. Hence, there is no restriction as to the ratio of the amount of the raw material versus nitric acid.

Another advantage of the present invention is that it enables the elimination of huge absorbers for the regeneration of nitric acid required in conventional nitric acid oxidation processes.

Further advantages of the invention is that oxalic acid is obtained at high yield.

Still, further advantage of the present invention is that the production of oxalic acid can be most suitably carried out by a continuous operation. In the present invention, as the reaction is carried out substantially with molecular oxygen as the sole oxidant which is consumed during the reaction, there is no consumption of nitric acid. Also, there is no substantial loss of nitric acid during the reaction. Therefore, it may be easily understood that the process of the present invention can be carried out continuously and most economically with recirculation of the reaction medium comprising nitric acid.

According to the present invention ethylene glycol and/or glycolic acid are oxidized with oxygen in a reaction medium comprising nitric acid. The reaction medium can be an acid solution containing only nitric acid. But, depending on circumstances the reaction medium may contain auxiliary chemicals which help the smooth occurence of the oxidation.

The oxidation of ethylene glycol and/or glycolic acid are initiated in the presence of nitrogen oxides. Nitric acid, usually, contains some nitrogen oxides and it is not absolutely necessary that nitrogen oxides are added to or allowed to generated in the reaction system.

However, substances which when added to a nitric acid solution help the generation of nitrogen oxides from nitric acid may be added to effect smooth initiation of the oxidation.

These initiators include $NaNO_2$, formic acid and formaldehyde. Advantageously, ethylene glycol which is the raw material of the present invention is also an initiator of the oxidation and therefore the addition of initiator is generally not necessary when the glycol is present in the reaction mixture.

Also, in order to increase the oxidation rate, promoter or catalyst may be added. Preferable examples of the promoters are sulfuric, phosphoric acid, acetic acids, vanadium compounds, etc. These promoters may be used alone or in conjunction with other promoter or the initiator.

Of the promoters, sulfuric acid is the most preferable, because high yield is secured when sulfuric acid is employed and the product does not contain heavy metals which are found in the product when heavy metal catalysts are employed for the oxidation.

The process of the present invention is carried out by bringing ethylene glycol and/or glycolic acid in contact with molecular oxygen in the reaction medium comprising nitric acid. The contact may be carried out by maintaining a reaction mixture containing ethylene glycol and/or glycolic acid in an atmosphere comprising molecular oxygen, or by introducing molecular oxygen into the reaction mixture.

Reaction temperatures influence not only the rate of reaction but also the selectivity of the formation of the desired product. The reaction may be carried out at a temperature ranging from 30° to 100° C., but preferable range of the temperature is from 60° to 100° C.

Therefore, in the practice of the present invention, ethylene glycol and/or glycolic acid are heated to a suitable temperature in the reaction medium in an atmosphere comprising molecular oxygen or with introduction of molecular oxygen.

Preferable concentration range of nitric acid in the present invention is from 2 to 70 percent by weight in the reaction medium. The reaction medium here is defined as the content of the reaction mixture in the liquid phase except pure ethylene glycol and/or glycolic acid.

When sulfuric acid is employed, preferable concentration range of the acid in the reaction medium is from 20 to 78 percent by weight. The reaction mixture may contain water in addition to nitric acid and/or sulfuric acid and other additives. If the reaction medium substantially consists of nitric acid, sulfuric acid and water, the oxidation is most suitably carried out when the concentration of water is from 20 to 50 percent by weight.

Concentration of the initiator employed in the reaction medium is from 0.01 to 5 percent by weight.

Vanadium compounds employed as the promoter in the present invention comprise vanadium pentoxide, ammonium metavanadate, vanadium trioxide, vanadium dioxide and vanadium monoxide, and they are used in a concentration of 0.001–0.1 percent in the reaction medium.

As to the introduction of reactants and molecular oxygen many variations are possible. Most practically ethylene glycol and/or glycolic acid and molecular oxygen are introduced simultaneously to a reactor or a reaction vessel containing the reaction medium comprising nitric acid, or ethylene glycol and/or glycolic acid, molecular oxygen and the reaction medium are fed simultaneously to a reactor previously containing a quantity of the reaction medium.

The reaction may be carried out either batch-wise or continuously. The reaction may be made continuous, if a part of the reaction mixture is continuously removed when the reaction is carried out with continuous introduction of the raw material, oxygen and the reaction medium.

It is desirable that after the end of the raw material feed, molecular oxygen is continuously introduced to the reaction mixture to complete the oxidation.

Ethylene glycol and/or glycolic acid can be introduced as such or in the form of aqueous solutions.

The initiator may be added at the start of the oxidation, but as it is consumed during the reaction by being oxidized with nitric acid to generate nitrogen oxides, it may be preferably added from time to time or continuously during the reaction.

The present invention can be most suitably carried out with introduction of pure oxygen. But also it is possible that the reaction is carried out with introduction of molecular oxygen and an inert gas. As to the introduction of an oxygen containing gas, several alternatives are possibly employed. The oxygen containing gas (either pure oxygen or oxygen plus inert gas) may be introduced to the vapor phase above the liquid phase of the reaction mixture. Preferably, the oxygen containing gas is introduced into the liquid phase and is sparged in the reaction mixture.

The introduction of oxygen into the liquid phase is preferable because it ensures higher reaction rate than in the case where oxygen is introduced to the vapor phase. The introduced oxygen can be recycled to be sparged again in the reaction mixture.

Any pressure may be employed for the reaction so long as gaseous oxygen exists in the reaction system. However, it is preferable that the reaction is carried out under pressure, because the oxidation rate increases with the increase of the pressure.

After the completion of the reaction, oxalic acid produced is crystallized by cooling, and then is separated by filtration or centrifugation.

The mother liquor resulting from the filtration or centrifugation can be recycled to the oxidation stage with addition of small amount of the components of the reaction medium which were lost during the reaction.

The process of the present invention will now be further explained by way of following Examples.

EXAMPLE 1

In a 300 cc autoclave provided with a magnetic agitator, 101 g of an aqueous solution of 62.5 wt. percent nitric acid was charged. The air in the autoclave was replaced completely with oxygen gas. After the nitric acid solution had been heated to 80° C., oxygen gas was further introduced to make the pressure in the autoclave 3 kg/cm$^2$ gauge. Ethylene glycol was pumped into the autoclave at a rate of 9.7 g/hr over a period of 3 hours while the temperature of the reaction mixture having been maintained at 80° C. The pressure of 3 kg/cm$^2$ gauge was also maintained by supplying oxygen to compensate for the oxygen consumption during the reaction. The consumed oxygen amounted to 22.5 l during the reaction period of 6 hours. The analysis of the reaction mixture showed that the yield of oxalic acid based on ethylene glycol was 88 percent. Only a few nitrogen gas and nitrogen monoxide which are not recoverable as nitric acid was found. A mother liquor resulting from separation of oxalic acid crystal contained 56.5 wt. percent nitric acid and 3.0 wt. percent oxalic acid. The mother liquor in an amount of 95 g was recycled in the autoclave, the same operation as described above was repeated with pumping ethylene glycol in the autoclave at a rate of 9.3 g/hr over a period of 3 hours. After the reaction for further 6 hours, the analysis of the reaction mixture showed that the yield of oxalic acid based on ethylene glycol was 90 percent.

EXAMPLE 2

In the autoclave used in Example 1, 101 g of an aqueous solution of 62.5 wt. percent nitric acid was charged. The air in the autoclave was replaced completely with oxygen gas. After the nitric acid solution had been heated to 80° C., oxygen gas was further introduced to make the pressure in the autoclave 6 kg/cm$^2$gauge. A mixture containing 20.9 wt. percent ethylene glycol and 58.7 wt. percent glycolic acid was pumped into the autoclave at a rate of 15.2 g/hr over a period of three hours while the temperature of the reacting mixture was maintained at 80° C. The reaction was contained further 6 hours under supplying oxygen to compensate for oxygen consumption. The analysis of the reaction mixture showed that the yield of oxalic acid based on ethylene glycol and glycolic acid was 91.4 percent.

EXAMPLE 3

In a 5-necked reaction vessel provided with a stirrer, a reflux condenser (to which a stopcock, a bubbling bottle and a gas holder were connected), an ethylene glycol inlet, and an oxygen gas inlet to which a gas burette was connected, 70.2 g of 96.5 wt. percent sulfuric acid, 71.2 g of 60.6 wt. percent nitric acid and 45.8 g of water were charged.

The air in the whole reaction system was replaced with oxygen gas. Then the acid mixture was heated to 80° C. and 12.25 g of ethylene glycol was gradually added to the mixture over a period of 8 hours. Absorbed oxygen amounted to 8.8 l during this period. The yield of the oxalic acid thus produced was 92.3 percent.

EXAMPLE 4

In the autoclave used in Example 1, 89.5 g of an acid mixture consisted of 36.5 wt. percent sulfuric acid 23.4 wt. percent nitric acid and 40.1 wt. percent water were charged. The air in the autoclave was replaced completely with oxygen gas. After the acid mixture had been heated to 80° C., oxygen gas was further introduced to make the pressure in the autoclave 4 kg/cm² gauge. Ethylene glycol was pumped into the autoclave at a rate of 5.92 g/hr over a period of 7 hours while the temperature of the reaction mixture having been maintained at 80° C. The pressure of 4 kg/cm² gauge was also maintained by supplying oxygen to compensate for the oxygen consumption during the reaction. The consumed oxygen amounted to 31 l. The analysis of the reaction mixture showed that the yield of oxalic acid based on ethylene glycol and the decomposition of ethylene glycol into carbon dioxide were 91.1 percent and 6 percent, respectively. Neither nitrogen gas nor nitrogen monoxide which is not recoverable as nitric acid was found, and all the nitric acid originally present was found in the form of nitric acid showing that all the nitrogen oxides formed during the reaction were converted to nitric acid. This result shows that ethylene glycol can be oxidized with oxygen gas in the presence of nitric acid.

EXAMPLE 5

In the autoclave used in Example 1, 187.2 g of an aqueous solution constituting 36.7 wt. percent sulfuric acid and 23.3 wt. percent nitric acid was charged. The air in the autoclave was replaced completely with oxygen gas. After the mixed acid solution had been heated to 80° C., pure oxygen was introduced to make the pressure 10 kg/cm² gauge. Ethylene glycol was pumped into the autoclave at a rate of 4.91 g/hr over a period of 3-½ hours while the temperature of the reacting mixture was maintained at 80° C. The pressure of 10 kg/cm² gauge was also maintained by supplying oxygen to compensate for oxygen consumption during the reaction. The consumed oxygen amounted to 12.21 l. Then ethylene glycol supply was stopped and the reaction mixture was maintained at the same temperature and pressure for 8-½ hours. The analysis of the reaction mixture showed that the yield of oxalic acid based on ethylene glycol was 94.4 percent.

EXAMPLE 6

In the same reaction vessel as used in Example 3 except a glycolic acid inlet, 100 g of 98.4 wt. percent sulfuric acid, 100 g of 61.0 wt. percent nitric acid, 30 g of water and 0.5 g of NaNO₂ were charged. The air in the whole reaction system was replaced with oxygen gas. Then the acid mixture was heated to 80° C. and 64.4 g of aqueous solution of 50 wt. percent glycolic acid was added to the mixture over a period of 1 hour. The atmospheric pressure in the system was maintained by supplying oxygen to compensate for the oxygen consumption during the reaction. After 6 hours, the consumed oxygen amounted to 7.3 l. The yield of oxalic acid was 85.5 percent.

EXAMPLE 7

In the autoclave used in Example 1, 72.1 g of 95.2 wt. percent sulfuric acid, 72.1 g of 61.2 wt. percent nitric acid and 43.6 g of water were charged. The air in the autoclave was replaced completely with oxygen gas. After the acid mixture had been heated to 80° C., oxygen gas was further introduced to make the pressure in the autoclave 4.0 kg/cm² gauge. 95 wt. percent glycolic acid containing 5 wt. percent ethylene glycol was pumped into the autoclave at a rate of 17.1 g/hr over a period of 3-¾ hours while the temperature of the reaction mixture having been maintained at 80° C. The pressure of 4.0 kg/cm² gauge was also maintained by supplying oxygen to compensate for the oxygen consumption during the reaction. After 6 hours, the consumed oxygen amounted to 24.2 l. The analysis of the reaction mixture showed that the yield of oxalic acid based on glycolic acid and ethylene glycol was 91 percent. Neither nitrogen gas nor nitrogen monoxide which is not recoverable as nitric acid was found. Mother liquors resulting from separation of oxalic acid crystal contained 37.5 wt. percent sulfuric acid, 24.0 wt. percent nitric acid and 3.0 wt. percent oxalic acid. The mother liquor can be recycled for use of another reactions.

What is claimed is:

1. A process for the production of oxalic acid comprising oxidizing a reactant selected from the group consisting of ethylene glycol and glycolic acid by contacting said reactant with gaseous molecular oxygen at a temperature of from about 30° to 100° C. in a reaction medium comprising nitric acid, wherein the amount of gaseous molecular oxygen employed is at least the stoichiometric amount necessary to form oxalic acid from said reactant.

2. A process according to claim 1 in which the reactant or an aqueous solution thereof, a molecular oxygen-containing gas and a solution comprising nitric acid are fed simultaneously to a reactor.

3. A process according to claim 2 wherein said reactant or an aqueous solution thereof, said molecular oxygen-containing gas and said solution comprising nitric acid are continuously fed to said reactor and a part of the reaction mixture is continuously withdrawn therefrom.

4. A process according to claim 1 in which the reaction medium comprises at least one promoter selected from the group consisting of sulfuric acid, vanadium pentoxide, ammonium metavanadate, vanadium trioxide, vanadium dioxide and vanadium monoxide.

5. A process according to claim 4 in which the reaction medium comprises from 20 to 78 percent by weight of sulfuric acid and from 20 to 50 percent by weight of water.

6. A process according to claim 4 in which the concentration of the vanadium compound is 0.001 to 0.1 percent by weight.

7. A process according to claim 1 in which the reaction medium comprises at least one initiator selected from the group consisting of NaNO₂, formic acid and formaldehyde.

8. A process according to claim 7 in which the initiator is fed continuously or intermittently to the reaction medium.

9. A process according to claim 7 in which the concentration of the initiator is from 0.01 to 5 percent by weight.

10. A process according to claim 1 in which the reaction is carried out at a temperature ranging from 60° to 100° C.

11. A process according to claim 1 in which the oxidation is carried out with introduction of a molecular oxygen-containing gas.

12. A process according to claim 1 in which the concentration of nitric acid is from 2 to 70 percent by weight in the reaction medium.

13. A process according to claim 1 in which the oxidation is carried out under pressure.

14. A process according to claim 1 in which the reactant or an aqueous solution thereof and a molecular oxygen-containing gas are fed simultaneously to a reactor.

15. A process according to claim 2 wherein the gaseous molecular oxygen is introduced into the liquid phase in the reaction.

16. A process according to claim 2 wherein the reactant is added to the reaction medium and then the gaseous molecular oxygen is added thereto continuously.

17. A process according to claim 1 wherein, after the reaction, the oxalic acid produced is crystallized by cooling the reaction mixture and then separated by filtration or centrifugation.

18. A process according to claim 1 in which the mother liquor containing nitric acid resulting from the separation of the product oxalic acid formed is recycled to the oxidation stage.

* * * * *